United States Patent
Van Den Bosch et al.

(10) Patent No.: US 7,289,531 B2
(45) Date of Patent: Oct. 30, 2007

(54) NETWORK-SYSTEM, MANAGEMENT-SYSTEM, METHOD AND COMPUTER PROGRAM PRODUCT

(75) Inventors: Sven Jozef Jeanne Van Den Bosch, Lochristi (BE); Gert Van Hoey, Gentbrugge (BE); Olivier Didier Duroyon, San Diego, CA (US); Guido August Luyts, Ham (BE); Jan Martha Romain Van Bogaert, Keerbergen (BE); An Maria Irene Deckers, St.Katelijne Waver (BE); Paloma De La Vallee, Aartselaar (BE); Nathalie Maria Cornelia Degrande, Overmere (BE); Hans De Neve, Turnhout (BE)

(73) Assignee: Alcatel, Paris (FR)

( * ) Notice: Subject to any disclaimer, the term of this patent is extended or adjusted under 35 U.S.C. 154(b) by 1021 days.

(21) Appl. No.: 10/179,187

(22) Filed: Jun. 26, 2002

(65) Prior Publication Data

US 2003/0043821 A1 Mar. 6, 2003

(30) Foreign Application Priority Data

Jun. 27, 2001 (EP) .................................. 01401713

(51) Int. Cl.
*H04J 3/16* (2006.01)
(52) U.S. Cl. ...................... 370/466; 370/401
(58) Field of Classification Search ................ 370/407, 370/400
See application file for complete search history.

(56) References Cited

U.S. PATENT DOCUMENTS

| | | | |
|---|---|---|---|
| 6,016,319 A | 1/2000 | Kshirsagar et al. | |
| 6,108,304 A | 8/2000 | Abe et al. | |
| 6,532,088 B1* | 3/2003 | Dantu et al. | 398/43 |
| 6,545,781 B1* | 4/2003 | Chang et al. | 398/51 |
| 6,889,278 B1* | 5/2005 | Hoerler et al. | 710/266 |
| 7,136,356 B2* | 11/2006 | Suzuki et al. | 370/235 |
| 7,167,443 B1* | 1/2007 | Dantu et al. | 370/218 |

FOREIGN PATENT DOCUMENTS

EP 0835009 A2 4/1998

OTHER PUBLICATIONS

J. van Bogaert, "Convergence of the Optical and Data Layers", published in Jun. 2001, Alcatel's Telecom Review, pp. 1-12.

(Continued)

*Primary Examiner*—Bob A. Phunkulh
(74) *Attorney, Agent, or Firm*—Sughrue Mion Pllc.

(57) ABSTRACT

Provided is a management-system for use in a network environment including a first and second IP networks and a transport network which connects the first and second IP networks. The management system includes: a converter for optimizing a path in an IP-domain via a first algorithm and for converting IP-traffic-signals into transport-traffic-signals; and an optimiser which optimizes a topology that overlays the transport network by optimizing channels in the transport-network according to at least one second algorithm. The first algorithm is an IP multi protocol label switching routing optimization algorithm. The second algorithm is an algorithm based on a plurality of constraints and objectives such as a flow conservation constraint, logical link capacity constraint, optical router port constraint, wavelength cost objective, optical router port occupation objective, advertised link number objective, spare capacity objective, wavelength re-use benefit objective and optical service level agreement constraint.

15 Claims, 1 Drawing Sheet

OTHER PUBLICATIONS

Figure 1:
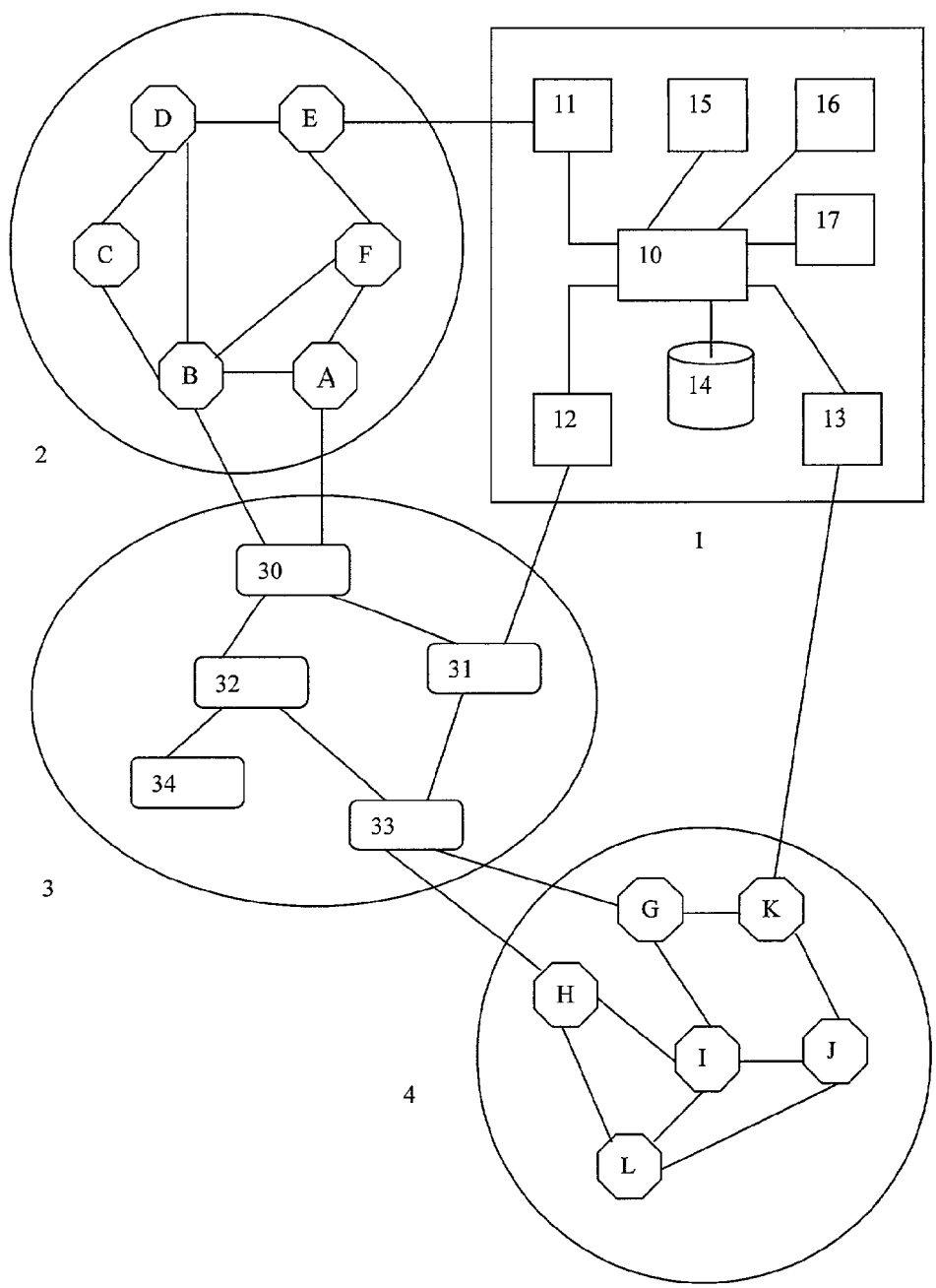

Murali Kodialam et al, "Integrated Dynamic IP and Wavelength Routing in IP Over WDM Networks", IEEE Infocom 2001, pp. 358-366, no month available.

A. Lardies et al, Optimal Network Design of Ultra-Long-Haul Transmission Networks, published in Jun. 2001, Alcatel's Telecom Review, pp. 1-8.

* cited by examiner

NETWORK-SYSTEM, MANAGEMENT-SYSTEM, METHOD AND COMPUTER PROGRAM PRODUCT

The invention relates to a network-system comprising at least a first IP-network comprising first nodes, at least two of these first nodes being first edge-nodes, a second IP-network comprising second nodes, a transport-network comprising channel-switches for switching channels, and a management-system for managing networks in an overlay environment.

Such a network-system is known from the article "Convergence of the optical and data layers" by J. van Bogaert, published in Alcatel's Telecom Review, week 24, June 2001. In this article's FIG. 3, three network models are shown, a first network model being an integrated environment or peer environment, where the topology of the transport-network is known to the management-system, a second network model being an overlay environment where the topology of the transport.network is not known to the management-system, and a third network model being a hybrid environment. The nodes in the IP-networks (Internet Protocol networks) for example correspond with label switched routers (for switching IP-packet-signals which have been labelled with routing info, each IP-packet-signal for example comprising several hundreds or thousands of bits), with the edge-nodes being those nodes which are connected to the transport-network. The transport-network corresponds for example with an optical network with said channel-switches (for example switching several Gbits/s) being for example optical cross connects and said channels being for example wavelengths or corresponds with an non-optical network, and is also known as an Automatically Switched Transport Network or ASTN. The management-system manages networks (at least said first IP-network) in an overlay environment for allowing, inter alia, traffic to flow from said first IP-network via said transport-network to said second IP-network, for example.

The known network-system is disadvantageous, inter alia, due to the combination of IP-networks routing IP-packet-signals and transport-networks switching channels generally dealing with traffic non-optimally.

It is an object of the invention, inter alia, of providing a network-system as described in the preamble, in which said combination deals with traffic in a more optimal way.

The network-system according to the invention is characterised in that said management-system comprises a converter for converting IP-traffic-signals into transport-traffic-signals thereby assuming that both IP-networks are coupled via a star-network with said transport-network corresponding to a star of said star-network, and an optimiser for in response to said converting optimising a use of channels in said transport-network according to at least one algorithm.

By providing said management-system with the converter for converting IP-traffic-signals into transport-traffic-signals thereby assuming that both IP-networks are coupled via a star-network (comprising at least one star) with said transport-network corresponding to a star of said star-network, due to the transport-network being considered to be a star, said converter for example converting in accordance with IP/MPLS (Multi Protocol Label Switching) can now convert more optimally, and with the optimiser for in response to said converting optimising a use of channels in said transport-network according to at least one algorithm, said optimiser for example being a processor+memory, the combination of IP-networks and transport-network can handle traffic more optimally (with the optimality for example depending upon at least said at least one algorithm).

The invention is based on the insight, inter alia, that instead of dealing with two complex parts at the same time, one complex part can be handled firstly thereby considering the other part to be of reduced complexity, after which the second complex part can be handled secondly thereby using the results of the first handling.

The invention solves the problem, inter alia, of providing a network-system which deals with traffic more optimally.

It should be noted that said optimiser will try to optimise the dealing with traffic, whether and how far certain goals are reached will depend upon many facts. As described before, the optimality may depend upon at least said at least one algorithm, but even when using the same algorithm, for different kinds and/or quantities of traffics, the results may differ. So, the optimiser generally improves the network usage.

It should further be noted that the article "Integrated Dynamic IP and Wavelength Routing in IP over WDM Networks" by M. Kodialam and T. V. Lakshman, published in IEEE, 2001, is about an integrated environment or peer environment, where the topology of the transport-network is known to the management-system. Such an environment is completely different from said overlay environment, and requires a completely different approach when trying to achieve better network usage. Further, said article is about an on-line situation, due to traffic being handled on-line, and flows being dealt with sequentially, where the network-system according to the invention is about an off-line situation, where flows are dealt with combined.

A first embodiment of the network-system according to the invention is characterised in that said at least one algorithm is defined by at least several constraints and several objectives.

Such constraints are for example flow conservation constraints, logical link capacity constraints, optical router port constraints and optical service level agreement constraints (one or more of them allowing the distinguishing between traffic requiring protected channels and traffic using unprotected channels). Such objectives are for example wavelength cost objectives, optical router port occupation objectives, advertised link number objectives, spare capacity objectives and wavelength re-use benefit objectives.

A second embodiment of the network-system according to the invention is characterised in that said converter converts IP-traffic-signals into transport-traffic-signals by in said first IP-network selecting a first edge-node and optimising IP-traffic.

By introducing a conversion of selecting the best edge-node in a certain IP-network and at the same time optimising the IP-traffic in the corresponding IP-network, instead of dealing with one major problem, now two interacting minor problems need to be solved, for example by dividing the (first/second) minor problems into (first/second) smaller parts, and by jumping from a solved first part to a second part yet to be solved and vice versa.

A third embodiment of the network-system according to the invention is characterised in that said management-system comprises an allocator for allocating at least one IP-packet-signal of at least one IP-network to at least one channel in said transport network.

By introducing the allocator, a further optimisation can be achieved, due to allocating each IP-packet-signal to its best location in a certain channel.

The invention further relates to a management-system for use in a network-system comprising at least a first IP-network comprising first nodes, at least two of these first nodes being first edge-nodes, a second IP-network comprising second nodes, a transport-network comprising channel-switches for switching channels, and said management-system for managing networks in an overlay environment.

The management-system according to the invention is characterised in that said management-system comprises a converter for converting IP-traffic-signals into transport-traffic-signals thereby assuming that both IP-networks are coupled via a star-network with said transport-network corresponding to a star of said star-network, and an optimiser for in response to said converting optimising a use of channels in said transport-network according to at least one algorithm.

A first embodiment of the management-system according to the invention is characterised in that that said at least one algorithm is defined by at least several constraints and several objectives.

A second embodiment of the management-system according to the invention is characterised in that said converter converts IP-traffic-signals into transport-traffic-signals by in said first IP-network selecting a first edge-node and optimising IP-traffic.

A third embodiment of the management-system according to the invention is characterised in that said management-system comprises an allocator for allocating at least one IP-packet-signal of at least one IP-network to at least one channel in said transport network.

The invention yet further relates to a method for use in a network-system comprising at least a first IP-network comprising first nodes, at least two of these first nodes being first edge-nodes, a second IP-network comprising second nodes, a transport-network comprising channel-switches for switching channels, and a management-system for managing networks in an overlay environment.

The method according to the invention is characterised in that said method comprises a first step of converting IP-traffic-signals into transport-traffic-signals thereby assuming that both IP-networks are coupled via a star-network with said transport-network corresponding to a star of said star-network, and a second step of in response to said converting optimising a use of channels in said transport-network according to at least one algorithm.

Embodiments of the method according to the invention correspond with the embodiments of the network-system and/or management-system according to the invention.

The invention also relates to a computer program product for running at least one algorithm in a management-system for use in a network-system comprising at least a first IP-network comprising first nodes, at least two of these first nodes being first edge-nodes, a second IP-network comprising second nodes, a transport-network comprising channel-switches for switching channels, and said management-system for managing networks in an overlay environment.

The computer program product is characterised in that said management-system comprises a converter for converting IP-traffic-signals into transport-traffic-signals thereby assuming that both IP-networks are coupled via a star-network with said transport-network corresponding to a star of said star-network, and an optimiser for in response to said converting optimising a use of channels in said transport-network according to said algorithm, which algorithm is defined by at least several constraints and several objectives, with said computer program product comprising at least several constraint-functions and several objective-functions.

Embodiments of the computer program product according to the invention correspond with the embodiments of the network-system and/or management-system according to the invention.

The article "Convergence of the optical and data layers" by J. van Bogaert, published in Alcatel's Telecom Review, week 24, June 2001, discloses in its FIG. 3 three network models. The article "Integrated Dynamic IP and Wavelength Routing in IP over WDM Networks" by M. Kodialam and T. V. Lakshman, published in IEEE, 2001, is about an integrated environment or peer environment, where the topology of the transport-network is known to the management-system. The article "Optimal network design of ultra-long-haul transmission networks" by A. Lardiés and G. Ester, published in Alcatel's Telecom Review, week 24, June 2001, discloses network design methodologies which will have to be re-examined to take maximum economic advantage of ultra-long-haul transmission capabilities. All references are considered to be incorporated in this patent application, as background information.

The invention will be further explained more detailledly at the hand of a drawing, whereby FIG. 1 discloses a network-system according to the invention and a management-system according to the invention.

FIG. 1 discloses a network-system according to the invention comprising a management-system 1 according to the invention and a first IP-network 2 and a second IP-network 4 and a transport-network 3.

Management-system 1 comprises a buffer/interface 11 coupled to IP-network 2, a buffer/interface 12 coupled to transport-network 3, a buffer/interface 13 coupled to IP-network 4, a converter 15, an optimiser 16, an allocator 17, all mutually coupled via a processor-system 10 which is further coupled to a memory 14.

IP-network 2 comprises an edge node A coupled to edge node B and to a node F, said edge node B further coupled to nodes C, D and F, said node C further coupled to node D, said node D further coupled to node E, said node E further coupled to node F and to buffer/interface 11, and said node F.

Transport-network 3 comprises a channel-switch 30 coupled to edge nodes A and B and to channel-switched 31 and 32, said channel-switch 31 further coupled to channel-switch 33 and to buffer/interface 12, said channel-switch 32 further coupled to channel-switches 33 and 34, said channel-switch 33 further coupled to edge-nodes G and H in IP-network 4, and said channel-switch 34.

IP-network 4 comprises said edge-node G further coupled to nodes I and K, said edge-node H further coupled to nodes I and L, said node I further coupled to nodes J and L, said node J further coupled to nodes L and K, said node K further coupled to buffer/interface 13 and said node L.

In FIG. 1, for clarity reasons, each buffer/interface of management-system 1 is coupled to one node or one channel-switch. In practice, each buffer/interface may be coupled to several/all nodes in an IP-network and to several/all channel-switches in a transport-network, and/or management-system 1 may comprise many more buffer/interfaces each coupled to one or more nodes and/or channel-switches.

The network-system according to the invention comprising the management-system according to the invention functions as follows.

The IP-networks 2 and 4 comprise nodes A-F and G-L corresponding with IP routers, with the edge-nodes A and B and G and H being edge routers coupled to the transport-network. The interaction between the IP routers and the channel-switches like Optical Cross-Connects (OXCs) inter-connected by optical links is over a well-known signaling and routing interface. Each OXC is capable of switching a data stream from a given input port (ingress) to a given output port (egress). One or more control channels exist between neighboring OXCs for signaling purposes. In an overlay environment (client-server model), the IP domain is a client of the optical domain. It will request optical paths from the optical transport network according to one of the following scenarios: centralised out-of-band reservations (the IP domain negotiates wavelength with the transport layer), centralised in-band reservations (the IP domain triggers Label Switched Router or LSR to negotiate wavelength with OXC), or distributed in-band reservations (LSR autonomously negotiates with OXC). An owner of a transport-network does not want other owners of other transport-networks or Internet Service Providers (or ISPs owning one or more IP-networks) to look into his network Therefore rules and regulations shall be placed on the network to regulate visibility, with both the routing in the IP domain and the logical topology over the optical transport network being subject to optimisation, due to a layered scheme of wavelength-requests and Label Switched Path- or LSP-requests being potentially inefficient and possibly damaging the service of an ISP, in case the only available wavelength between two boundary routers is torn down.

The invention for optimising the LSP-requests and the wavelength-requests consists minimally of two phases, preferably three phases. In the first phase, the transport-network is replaced by a simple virtual star network and the LSP paths in the IP domain are optimised. This optimisation also selects the ingress boundary router and the egress boundary router for each connection. This information is summarised into a transport-network traffic matrix which is unaware of the individual LSPs. This traffic matrix is then used as an input for the second phase of the wavelength optimisation. The wavelength optimisation determines the IP topology overlaying the transport network and the capacity of each of the IP links (bundles). The third phase of the optimisation maps individual LSPs to transport channels (wavelengths).

The first phase is performed by converter 15 and consists of optimising the path in the IP domain for each connection. The optimisation aspect involves selecting the optimal ingress boundary router and the optimal egress boundary router for each connection and leads to the traffic matrix for the transport network. Then due to the transport-network being replaced by a star of a star network the path computation can be done with any IP/MPLS (Multi Protocol Label Switching) routing optimisation algorithm. The bandwidth of the connecting links is for example chosen to be the sum of the capacity of the interfaces connected to the transport network (but other choices are possible). All link metrics are for example chosen equal (but other choices are possible). The absolute value of the link metric in this virtual topology is of minor importance or less. Between each pair of boundary routers, there usually exists only one path over the abstract topology over the transport network. In this way, choices are focused on the optimisation of resources in the IP domain only, particularly on the choice of the ingress boundary router and the egress boundary router for each connection. Then, for example a known centralised off-line tool running a linear programming based optimisation algorithm could perform the computation, inter alia. The optimisation outputs a list of LSPs. At this point, LSPs traversing the transport network do this in a single hop (ignoring the virtual router). This is equivalent to the specification of the traffic matrix over the ASTN. This traffic matrix will be used as input for the wavelength optimisation, which attempts to reduce the wavelength cost by aggregating LSPs.

The second phase for optimising the wavelength configuration over the ASTN corresponds with the optimiser 16 optimising the virtual topology overlaying the ASTN and the determination of the capacity of each link in this topology. The wavelength optimisation makes an abstraction of the individual LSPs, and the traffic matrix for the transport network that was derived in the first serves as an input signal. This traffic matrix contains two bandwidth entries for each pair of boundary routers: one for traffic requiring protection and one for unprotected traffic.

The topology consists of a set of boundary routers R through which traffic enters and leaves the ASTN. The amount of traffic between two boundary routers m and n is denoted as $ALPHA_{mn}$. A distinction is made between traffic requiring protected ($ALPHA_{mn}^P$) or unprotected ($ALPHA_{mn}^U$) optical paths. A logical link is a connection over the transport network between two boundary routers i and j. Both i and j are elements of R as well. The amount of traffic a logical link can transport depends on the amount and the size of the wavelengths of which it consists. The flow variables $FHI_{ij}^m$ describe the amount of traffic that is flowing on logical link ij due to traffic entering the transport network through ingress m. Traffic that requires protected wavelengths and traffic that does not, is denoted by $FHI_{ij}^{m,U}$ and $FHI_{ij}^{m,P}$, respectively. In the special case where all the traffic is transported along a direct logical link from the ingress m to appropriate egress, $FHI_{ij}^m$ equals zero for any i≠m, and equals the corresponding traffic matrix elements $ALPHA_{mj}$ if i=m. The flow conservation constraint expresses that for each of the ingresses m, the net inflow of traffic into a boundary router j equals the traffic from m that is destined to j (the traffic matrix element $ALPHA_{mj}$) for any j different from m. The conservation constraint in boundary router m itself expresses that the net outflow of traffic equals the sum of all the traffic originating in m. The constant $c_{labda}^{max}$ (the capacity of the highest granularity of the optical paths) is included for normalisation purposes. By dividing by $c_{labda}^{max}$, the flow variables are dimensionless and have the same order of magnitude (zero up to a few tens), irrespective of the actual capacities of the optical paths. This ensures numerical stability of the problem when solving it using the LP solver.

Flow conservation constraint 1

$$\sum_{i \in R} \phi_{ij}^{m,U/P} - \sum_{i \in R} \phi_{ji}^{m,U/P} = \begin{cases} -\dfrac{1}{c_\lambda^{max}} \cdot \sum_{n \in R} \alpha_{mn}^{U/P} & \text{if } j = m \quad (m \in R, j \in R) \\ \dfrac{1}{c_\lambda^{max}} \cdot \alpha_{mj}^{U/P} & \text{if } j \neq m \end{cases}$$

For every logical link ij, a sufficient number of optical paths has to be provided in order to transport the traffic for which the path is routed along this logical link, which is expressed in the logical link capacity constraints. An optical path has one of a set of predefined channel types t∈T (e.g. T={OC-3, OC-12, OC-48, OC-192}), and its corresponding capacity is denoted as $c_{labda}^t$ (e.g., $c_{labda}^{OC-3}$=155 Mbps). The numbers of protected and unprotected wavelengths of a certain type t on the logical link ij are denoted by $labda^{t,P}_{i \leftrightarrows j}$ and $labda^{t,U}_{i \leftrightarrows j}$, respectively. Constraint 2a expresses that for each logical link ij, a sufficient number of protected optical paths has to be provisioned for all the traffic along ij that needs protection in the transport network. The fact that an optical path between i and j is bi-directional, i.e. that an optical path offers the same capacity $c_{labda}$ both from i to j and from j to i, implies that $labda_{i \leftrightharpoons j}$ and $labda_{j \leftrightharpoons i}$ are to be treated as one single variable. Constraint 2b expresses that the total logical link capacity, i.e. the sum of the capacities of the unprotected and protected optical paths on link ij, has to be sufficient in order to transport all the traffic (both the traffic that needs protected optical paths and the traffic that does not).

Logical link capacity constraints 2

$$c_\lambda^{max} \cdot \sum_{m \in R} \phi_{ij}^{m,P} \leq \sum_{t} \lambda_{i \leftrightarrow j}^{t,P} \cdot c_\lambda^t \qquad (i, j \in R) \qquad a$$

$$c_\lambda^{max} \cdot \sum_{m \in R} (\phi_{ij}^{m,U} + \phi_{ij}^{m,P}) \leq \sum_{t \in T} (\lambda_{i \leftrightarrow j}^{t,U} + \lambda_{i \leftrightarrow j}^{t,P}) \cdot c_\lambda^t \quad (i, j \in R) \qquad b$$

The optical router port constraints express that the number of optical paths terminated by a boundary router is limited by the number of optical ports of the router. The number of optical ports of type t of the router i is denoted as $pi^t_i$, and a distinction is made between optical ports that can be used to set up a protected optical path (ports with automatic protection switching, APS), and ports that do not have APS ($pi^{t,P}_i$ and $pi^{t,U}_i$). Inequality 3a indicates that the total number of optical paths terminated by a router is limited by its total number of ports. The number of protected optical paths is limited by $pi^P_i$, which is expressed in 3b. If every port of the boundary routers is of a fixed type (e.g. OC-48), then the variables $pi^{t,P}_i$ and $pi^{t,U}_i$ have fixed values that are determined by the hardware and by the connections that are available between the boundary routers and the boundary cross-connects. If, however, router ports could be configured according to the needs of the transport network (i.e. dynamic channelisation: e.g., a port could either be a clear capacity OC-48, or an OC-48 channelised into four OC-12 channels), then the optimiser should be able to decide which configuration to choose for this port. This decision is covered by the variables and constraints in 3c and 3d. The channel type selection variable $x^t_{i,k}$ is a binary variable that indicates whether or not port k of router i is of type t. Constraint 3d indicates that each router port can only have one channel type t, and constraint 3c expresses the numbers of available router ports as a function of the decision variables $x^t_{i,k}$, the amount $PI^t_{i,k}$ being the number of channels of type t that is offered by port k of router i, if it is configured as a type t port. The numbers $Pi^t_{i,k}$ are the actual router port description that is on of the input files for the optical path optimisation. If, for example, port k of router i can either be used as a clear capacity OC-48, or an OC-48 channelised into four OC-12 channels, then $PI^{OC-48}_{i,k}=1$ and $PI^{OC-12}_{i,k}=4$).

Optical router port constraints 3

$$\sum_{j \in R} (\lambda_{i \leftrightarrow j}^{t,U} + \lambda_{i \leftrightarrow j}^{t,P}) \leq \pi_i^{t,U} + \pi_i^{t,P} \quad (i \in R, t \in T) \qquad a$$

$$\sum_{j \in R} \lambda_{i \leftrightarrow j}^{t,P} \leq \pi_i^{t,P} \qquad (i \in R, t \in T) \qquad b$$

$$\pi_i^{t,U/P} = \sum_{k \in K_i} x_{i,k}^t \cdot \prod_{i,k}^{t,U/P} \qquad (i \in R, t \in T) \qquad c$$

$$\sum_{t \in T} x_{i,k}^t \leq 1 \qquad (i \in R, k \in K_i) \qquad d$$

The wavelength optimisation is guided by defining specific objectives. The primary objective will be the minimisation of the wavelength cost.

Wavelength cost objective 4

$$C = \frac{\sum_{i \in R} \sum_{j \in R} \sum_{t \in T} (c^{t,U\lambda} \lambda_{i \leftrightarrow j}^{t,U} + c^{t,P\lambda} \lambda_{i \leftrightarrow j}^{t,P})}{\sum_{i \in R} \sum_{t \in T} \left( c^{t,U\lambda} \cdot \prod_i^{t,U} + c^{t,P\lambda} \cdot \prod_i^{t,P} \right) / 2} \qquad 1$$

This equation defines the wavelength cost objective C as the sum of all the optical path number variables, weighted with a cost that depends on the capacity (channel type) of the optical path and its protection properties (protected or unprotected optical path). The wavelength cost is determined, inter alia, by installation (set-up), bandwidth, protection type and history, for example. The cost of setting up a wavelength is modeled by a fixed cost term. Economies of scale, however, cause the cost of bandwidth to decrease with its granularity. It can be expected that a single OC-48 will cost less than four OC-12 connections. In order to capture this effect, an economy factor $e_{labda}$ is introduced. Also, protected bandwidth will be more expensive than unprotected bandwidth. This is modeled by a protection cost multiplier $p_{labda}$. Finally, the operator may express a preference for incremental optimisation in order to conserve the existing wavelength configuration. Preferred wavelengths will offer a reuse benefit (possibly because they were present in a prior configuration) $b_{labda}$. Free wavelengths are priced normally. All costs are normalised to the variable cost of an OC-3. This leads to the following cost model for OC-3, OC-12, OC-48 and OC-192 wavelengths.

$$C_{OC-3} = C_0 + 1 \qquad 5$$

$$C_{OC-12} = 4 \cdot b_\lambda \cdot p_\lambda \cdot e_\lambda + C_0 \qquad 6$$

$$C_{OC-48} = 16 \cdot b_\lambda \cdot p_\lambda \cdot e_\lambda^2 + C_0 \qquad 7$$

$$C_{OC-192} = 32 \cdot b_\lambda \cdot p_\lambda \cdot e_\lambda^3 + C_0 \qquad 8$$

With this cost model, the cost of a protected and an unprotected wavelength is independently configurable.

A number of secondary criteria for the optimisation have been identified and are introduced as (optional) secondary objectives in the objective function. They include minimisation of the optical router port occupation, minimisation of the number of advertised IP links and maximisation of the spare capacity.

Maximising the minimum number of occupied ports of a boundary router maintains the flexibility and dynamicity of the transport network. The router port occupation objective P is defined as a maximum value over all routers of the relative amount of router ports that is actually used to set up a wavelength. For each port k of a router i, the $x^t_{i,k}$ variables are either equal to zero for every $t \in T$ (the port is not used), or they are equal to zero for all but one value of t (the port is used, and t corresponds to its type/capacity). As a consequence, the sum over all router ports amounts to the number of occupied router ports. The denominator $K_i$ is the number of ports of router i, in order to obtain a percentage of occupied interfaces.

Optical router port occupation objective 9

$$P \geq \frac{\sum_{k \in K_i} \sum_{t \in T} x_{i,k}^t}{|K_i|} \quad (i \in R) \qquad 10$$

Minimising the number of links (forwarding adjacencies) A that are advertised into the IGP reduces the flooding overhead in the IP domain (IGP meaning Interior Gateway Protocol, this is an intra-area routing/signaling algorithm, OSPF or IS-IS are examples of IGPs). The advertised link objective A is proportional to the total number of logical links that is advertised in the IP domain. A is calculated using intermediate binary variables $a_{i \leftrightarrow j}$ that indicate whether or not wavelengths are set up between boundary routers i and j.

Advertised link number objectives 10

$$A = \frac{1}{2|R|} \sum_{i \in R} \sum_{j \in R} a_{i \leftrightarrow j} \qquad 1 \qquad a$$

$$a_{i \leftrightarrow j} \geq \frac{\sum_{t \in T} (\lambda_{i \leftrightarrow j}^{t,U} + \lambda_{i \leftrightarrow j}^{t,P})}{\min\left(\sum_{t \in T}\left(\prod_i^{t,U} + \prod_i^{t,P}\right), \sum_{t \in T}\left(\prod_j^{t,U} + \prod_{ji}^{t,P}\right)\right)} \quad (i, j \in R) \qquad b$$

The spare capacity objective value S, which indicates the minimal relative amount of bandwidth that remains unused on every logical link ij is defined by equation 11. It should be noted that the single inequality $S \geq 0$ can substitute the logical link capacity constraint 2b (not 2a).

Spare capacity objective 11

$$S \leq \frac{1}{c_\lambda^{\max}} \left( \sum_{t \in T} c_\lambda^t \cdot (\lambda_{i \leftrightarrow j}^{t,U} + \lambda_{i \leftrightarrow j}^{t,P}) - c_\lambda^{\max} \cdot \sum_{m \in R} (\phi_{ij}^{m,U} + \phi_{ij}^{m,P}) \right) + (1 - a_{i \leftrightarrow j}) (i, j \in R)$$

The objectives are combined into a single objective function by means of configurable coefficients. The objective function has the form of minimising function 12.

minimise $c_C \cdot C + c_P \cdot P + c_A \cdot A - c_S \cdot S$ \qquad 12

The coefficients are chosen such that they effectively induce strict priority between the objectives. With C being the primary objective, $c_C$ is always the largest coefficient.

If wavelength optimisation is performed periodically, it may be desirable to conserve (as much as possible) an existing wavelength configuration. An extreme case may require the new solution to be strictly incremental to the previous one. This can be achieved by attributing a benefit b, that can subtracted from the wavelength cost, to every wavelength of a previous configuration that is preserved (or re-used) in the new solution C.

The user can label each wavelength of an existing configuration as fixed, preferred, or free. Fixed wavelength are re-used in the new solution at all cost. Subtracting a benefit from the wavelength cost if the wavelength is reused encourages the re-use of preferred wavelengths. Free wavelengths do not contribute this benefit. An additional wavelength re-use benefit objective B is specified in objectives 13, which is subtracted from the wavelength cost in the optimisation.

Wavelength re-use benefit objectives 13

$$B = \frac{\sum_{i \in R} \sum_{j \in R} \sum_{t \in T} (c^{t,Ub} \cdot b_{i \leftrightarrow j}^{t,U} + c^{t,Pb} \cdot b_{i \leftrightarrow j}^{t,P})}{\sum_{i \in R} \sum_{t \in T} \left( c^{t,U\lambda} \cdot \prod_i^{t,U} + c^{t,P\lambda} \cdot \prod_i^{t,P} \right) / 2} \quad 1 \qquad a$$

$$\lambda_{i \leftrightarrow j}^{t,U/P} \geq {}_{fx}\Gamma_{i \leftrightarrow j}^{t,U/P} \qquad (i, j \in R, t \in T) \qquad b$$

$$b_{i \leftrightarrow j}^{t,U/P} \leq \lambda_{i \leftrightarrow j}^{t,U/P} \qquad (i, j \in R, t \in T) \qquad c$$

$$b_{i \leftrightarrow j}^{t,U/P} \leq {}_{fx}\Gamma_{i \leftrightarrow j}^{t,U/P} + {}_{pr}\Gamma_{i \leftrightarrow j}^{t,U/P} \qquad (i, j \in R, t \in T) \qquad d$$

For every link ij, $_{fx}$GAMMA$^{U/P}_{i \leftrightarrow j}$ and $_{pr}$GAMMA$^{U/P}_{i \leftrightarrow j}$ denote the number of optical paths of type t on logical link ij that are fixed and preferred, respectively. $b^t_{i \leftrightarrow j}$ is the number of optical paths of type t on link ij for which a benefit is taken into account. The inequalities in b express that the number of optical paths on link ij needs to be at least the number of fixed optical paths, the number of optical paths for which a benefit is taken into account, is limited by both the number of optical paths in the current solution c, and the number of optical paths specified as fixed or preferred d.

These constraints are specified separately for the protected and unprotected optical paths, and for every type t of optical paths. The total benefit B is defined as the weighted sum of the benefits on every link ij, where the weights $c^{tPb}$ and $c^{tUb}$ denote the benefit for re-using a single protected or unprotected optical path of type t. A benefit for re-using an optical path can be considered as a reduction of the cost of that optical path. Therefore, the values of $c^{tPb}$ and $c^{tUb}$ should not be set to a larger value than $c^{tPlabda}$ and $c^{tUlabda}$, respectively, because this would result in negative costs. The total benefit B is subtracted from the optical path cost C in the objective function. It has the same normalisation factor in the denominator as the optical path cost objective value.

The operator is able to request a solution that maximally conserves an existing wavelength configuration. He can do so by labeling all currently existing wavelengths as fixed, which causes the optimiser to deliver an incremental solution. Alternatively, he may wish to rationalise his configuration by eliminating unneeded wavelengths. In this case, he can label the wavelengths eligible for deletion as preferred.

Co-ordination of LSP protection and wavelength protection is a major issue. The solution proposed in the optimiser is based on the following observations. Traffic associated with unprotected trunks does not require protected wavelengths. Protection traffic does not require protected wavelengths. Working traffic associated with a protected trunk requires a protected wavelength if the primary and protection paths of the trunk share the same boundary ingress router and boundary egress router. If the primary and protection paths of a protected trunk have different ingress and/or egress, different options exist. Primary and protection paths may be routed along unprotected wavelengths that are requested to be physically disjoint within the transport network. They may be routed along two unprotected wavelengths if a certain risk is accepted that both primary and protection paths could fail in case of a failure in the transport network. Finally, the primary path may be routed along a protected wavelength and the protection path along an unprotected wavelength, which implies that primary and protection path cannot fail simultaneously within the transport network. Clearly, the last option is the safest but also the most wasteful. This embodiment currently uses the second approach by default, with the possibility to change to the third approach.

Different operators or entities can manage the IP/MPLS network and the ASTN. In this case, the IP provider may well lease transport capacity from the transport provider under a contractual agreement. Such a contract is denoted an optical service level agreement (O-SLA).

An O-SLA is considered to be unidirectional and to specify performance expectations (i.e., the service level) for the IP service domain as well as imposed constraints such as closed user groups (CUG). O-SLA parameters could include:

Capacity constraints: An ingress O-SLA may contain limits on the maximum number of wavelengths that can be established from a specific ingress point, possibly as a function of time of day, as well as bandwidth constraints (OC-48, OC-192, . . . ). An egress O-SLA may put capacity constraints on the wavelengths that the receiving IP service domain is willing to terminate.

Service performance parameters: Examples are wavelength latency, supported protection/restoration options, reliability, availability, supported routing constraints, accessibility (i.e., wavelength request blocking probability), responsiveness (specifying upper limits to the processing time of wavelength requests), . . . .

Constraints on the 'scope' of wavelength request: This may be viewed as an extension to the concept of CUGs, which by nature already exhibit reachability limitations. Scope constraints are intended to additionally restrict the topological extent of wavelengths. For example, the optical domain service provider might agree to the set-up of wavelengths, up to a certain maximum capacity, but only if these wavelengths are destined to a specific set of egress points within the CUG.

In the present embodiment, the O-SLA is assumed to specify, for each pair of boundary routers, the maximum number $\text{ETA}^{t,U}_{i \leftrightarrows j}$ and $\text{ETA}^{t,P}_{i \leftrightarrows j}$ of (protected and unprotected) optical paths of a certain type t that can be requested between two particular boundary routers i and j. Such an O-SLA introduces additional O-SLA constraints on top of the port and link constraints.

Optical Service Level Agreement constraints 14

$$\lambda^{t,U}_{i \leftrightarrow j} + \lambda^{t,P}_{i \leftrightarrow j} \leq \Lambda^{t,U}_{i \leftrightarrow j} + \Lambda^{t,P}_{i \leftrightarrow j} + v^{t,U}_{i \leftrightarrow j} + v^{t,P}_{i \leftrightarrow j} \quad (i, j \in R, t \in R) \quad a$$

$$\lambda^{t,P}_{i \leftrightarrow j} \leq \Lambda^{t,P}_{i \leftrightarrow j} + v^{t,P}_{i \leftrightarrow j} \quad (i, j \in R, t \in R) \quad b$$

$$V = \frac{\sum_{i \in R} \sum_{j \in R} \sum_{t \in T} (c^{t,Uv} \cdot v^{t,U}_{i \leftrightarrow j} + c^{t,Pv} \cdot v^{t,P}_{i \leftrightarrow j})}{\sum_{i \in R} \sum_{t \in T} \left( c^{t,U\lambda} \cdot \prod_{i}^{t,U} + c^{t,P\lambda} \cdot \prod_{i}^{t,P} \right) / 2} \quad c \quad 1$$

Constraint 14a expresses that the total number of optical paths of type t between routers i and j is limited by total number of (protected and unprotected) optical paths that are allowed by the O-SLA. Constraint 14b indicates that the number of protected optical paths is limited by the maximal number of protected optical paths that is specified by the O-SLA. If this limitation is strict, the O-SLA is denoted to be hard. Violation of a hard O-SLA may cause the optimiser to return no solution. The operator may, however, have the freedom to re-negotiate his O-SLA. In this case, he is better served by an indication of where additional resources are needed. Variables $v^{t,U}_{i \leftrightarrows j}$ and $v^{t,P}_{i \leftrightarrows j}$ are introduced in order to tolerate a violation of a soft O-SLA. They can be considered as an increase of the $\text{ETA}^{t,U}_{i \leftrightarrows j}$ and $\text{ETA}^{t,P}_{i \leftrightarrows j}$ variables. Based on the O-SLA violation variables $v^{t}_{i \leftrightarrows j}$, a weighted sum V is calculated in the same way as for the calculation of the wavelength cost objective value C. The costs $c^{t,Pv}$ and $c^{t,Uv}$ for the violation of the O-SLA contract by one unit can be configured separately for different channel types t and for protected and unprotected O-SLAs. The values of these costs and should be given substantially higher values than the corresponding wavelength costs, in order to discourage O-SLA violations, only permitting a violation if really no other possibility exists. The O-SLA violation value V is added to the wavelength cost C in the objective function.

The result of the wavelength optimisation provides the user with the topology and capacity of the IP links that have to be configured over the transport network. Parallel wavelengths are treated as a single link. The bandwidth of all wavelengths is combined into a single link capacity. In order to set up the required LSPs, each LSP needs to be mapped onto a specific wavelength.

The third phase of the optimisation determines the part of each LSP's path over the ASTN. The allocator 17 for mapping the LSPs onto the optical path configuration treats the LSPs one by one, and determines the path of the LSP as the shortest path in a network graph. The graph consists of one node per boundary router, and one edge per optical path (multiple edges between two nodes if the corresponding logical link contains more than one wavelength). The metric taken into account for the shortest-path calculations are updated after the mapping of every single LSP, and are a function of the available capacity on the wavelength that they represent, and on the bandwidth demand of the next LSP to be mapped.

The order in which the LSPs are mapped onto the network, is determined by three LSP properties. In order of importance, the requirement for protection within the transport network, the traffic class and the requested bandwidth are identified. LSPs requiring protection are treated first. They are mapped onto a restricted graph that only contains the links corresponding to protected optical paths. After mapping the protected LSPs, the LSPs not requiring protection are mapped onto the complete graph. In this way, the former take up the necessary capacity of the protected lightpaths, and then the latter can use capacity on the unprotected lightpaths or the remaining capacity on the protected lightpaths. Within each group, the LSPs are sorted according to traffic class (first EF, then AF1, . . . , AF4, then BE). For E-LSPs, the order is determined by the 'highest' traffic class that can be transported. LSPs that have the same protection properties and traffic class are sorted according to their bandwidth demand. LSPs with higher bandwidth demands are mapped first, in order to reduce the risk of blocking. If, for any reason, blocking would occur, the excess bandwidth on the congested link is fairly reduced for all affected traffic.

The cost of an optical path (a logical link in the topology) is dynamically determined before mapping a new LSP.

$$c = \cdot e^{\alpha \frac{AVBW-RQBW}{RQBW}} \qquad 15$$

In equation 15, AVBW is the amount of available bandwidth of the optical path, and RQBW is the bandwidth required by the next LSP. The cost definition is such that the cost of an optical path equals 1 if the available capacity equals the required bandwidth, and that it decreases exponentially as the available capacity increases. The parameter a determines the slope of the curve. The definition of AVBW and RQBW takes into account protection and preemption properties of the LSP to be mapped and of the LSPs that are already mapped.

More generally, the flow conservation constraint defines that for each of the ingresses m, the net inflow of traffic into a boundary router j is a function of and/or depends upon the traffic from m that is destined to j (the traffic matrix element $ALPHA_{mj}$) for any j different from m. The logical link capacity constraints define that for each logical link ij, a sufficient number of protected optical paths has to be provisioned for all the traffic along ij that needs protection in the transport network and that the total logical link capacity, i.e. the sum of the capacities of the unprotected and protected optical paths on link ij, has to be sufficient in order to transport a sufficient amount of or even all the traffic. The optical router port constraints define that the number of optical paths terminated by a boundary router is limited by the number of optical ports of the router, thereby distinguishing between optical ports that can be used to set up a protected optical path and ports that do not. So, the total number of optical paths terminated by a router is limited by its total number of ports. In case the optimiser is able to decide what kind of configuration is to be chosen, constraint 3d indicates that each router port can only have one channel type, and constraint 3c expresses the numbers of available router ports as a function of the decision variables, the amount being the number of channels of the certain type that is offered by a port of the router, if it is configured as said certain type port.

More generally, the wavelength cost objective is defined as the sum of the optical path number variables, possibly weighted with a cost that depends on the capacity (channel type) of the optical path and its protection properties (protected or unprotected optical path). The wavelength cost is determined by for example installation (set-up), bandwidth, protection type and history, inter alia. Preferably, said wavelength cost objective is used in combination with cost models. Maximising the minimum number of occupied ports of a boundary router maintains the flexibility and dynamicity of the transport network. Therefore the obtical router port occupation objective P is defined as a function of a maximum value over all routers of the relative amount of router ports that is actually used to set up a wavelength. Minimising the number of links (forwarding adjacencies) A that are advertised into the IGP reduces the flooding overhead in the IP domain. The advertised link objective A is a function of the total number of logical links that is advertised in the IP domain. The spare capacity objective value S indicates the minimal relative amount of bandwidth that remains unused on every logical link These objectives are preferably combined by a minimising function.

Additionally, preferably, an additional wavelength re-use benefit objective B is specified, which is subtracted from the wavelength cost in the optimisation. For every link there is number of optical paths of a type t on the logical link that are fixed and preferred, respectively. There is a number of optical paths of a type on the link for which a benefit is taken into account. The number of optical paths on the link needs to be at least the number of fixed optical paths, the number of optical paths for which a benefit is taken into account, is limited by both the number of optical paths in the current solution, and the number of optical paths specified as fixed or preferred. These constraints are specified separately for the protected and unprotected optical paths, and for every type of optical paths. The total benefit B is defined as the weighted sum of the benefits on every link, where weights denote the benefit for re-using a single protected or unprotected optical path of the type. A benefit for re-using an optical path can be considered as a reduction of the cost of that optical path. The total benefit B is subtracted from the optical path cost C in the objective function. It has the same normalisation factor in the denominator as the optical path cost objective value. The operator is able to request a solution that maximally conserves an existing wavelength configuration. The operator can do so by labeling all currently existing wavelengths as fixed, which causes the optimiser to deliver an incremental solution. Alternatively, the operator may wish to rationalise his configuration by eliminating unneeded wavelengths. In this case, the operator label the wavelengths eligible for deletion as preferred.

In management-system 1 buffer/interfaces 11, 12 and 13, converter 15, optimiser 16 and allocator 17 can be 100% hardware, 100% software or a mixture of both. Therefore, for example a converter also comprises a converting function, an optimiser also comprises an optimising function, and an allocator also comprises an allocating function. Each one of said buffer/interfaces 11, 12 and 13, converter 15, optimiser 16 and allocator 17 possibly has its own processor and memory not shown, in addition to processor 10 and memory 14. Each block shown or not shown can be integrated with each other block shown and/or not shown.

Processor 10 for example comprises a bus coupled to said buffer/interfaces 11, 12 and 13, converter 15, optimiser 16 and allocator 17, or comprises one or more of said buffer/interfaces 11, 12 and 13, converter 15, optimiser 16 and allocator 17 and/or one or more of their functions.

The invention claimed is:

1. A network-system comprising:
   at least one first IP-network which comprises a plurality of first nodes, at least two of the plurality of first nodes being first edge-nodes;
   a second IP-network comprising a plurality of second nodes;
   a transport-network comprising channel-switches for switching channels; and
   a management-system for managing networks in an overlay environment where a network topology of the transport network is not known to the management system, the management-system comprising:
      a converter which optimizes a network path in an IP-domain according to a first algorithm and converts IP-traffic-signals into transport-traffic-signals; and
      an optimiser which optimizes the topology that overlays the transport network and a use of channels in said transport-network according to at least one second algorithm based on a plurality of constraints and objectives, in response to converting by the converter, wherein the IP-domain comprises the first and second IP-networks and a single entity representing the transport-network.

2. The network-system according to claim 1, wherein the converter of the management system selects an optimal ingress boundary router and an optimal egress boundary router for each connections between the first and second IP-networks.

3. The network-system according to claim 1, wherein the path is a label switched path, the channels are wavelength channels, the first algorithm is an IP multi protocol label switching routing optimization algorithm and the optimiser of the management system reduces wavelength costs by aggregating label switched paths.

4. The network-system according to claim 1, wherein the management-system comprises an allocator which allocates at least one IP-packet-signal to at least one channel in said transport network.

5. The network-system according to claim 1, wherein the plurality of constraints and objectives of the second algorithm are one of flow conservation constraint, logical link capacity constraint, optical router port constraint, wavelength cost objective, optical router port occupation objective, advertised link number objective, spare capacity objective, wavelength re-use benefit objective and optical service level agreement constraint.

6. The network-system according to claim 1, wherein the converter of the management system replaces the transport network with a simple virtual star network so that both the first and second IP-networks are coupled via a star-network with the transport-network corresponding to a star of the star-network.

7. A management-system for use in a network-system, the management system comprising:
  a converter which optimizes a network path in an IP-domain according to a first algorithm and converts IP-traffic-signals into transport-traffic-signals; and
  an optimiser which optimizes a topology that overlays the transport network and a use of channels in said transport-network according to at least one second algorithm based on a plurality of constraints and objectives, in response to converting by the converter,
  wherein the network-system comprises:
    at least one first IP-network which comprises first nodes, at least two of the first nodes being first edge-nodes;
    a second IP-network which comprises second nodes;
    a transport-network which comprises channel-switches for switching channels,
  wherein the management system manages the network in an overlay environment where the network topology of the transport network is not known to the management system, and
  wherein the IP-domain comprises the first and second IP-netx orks and a signle entity representing the transport-network.

8. The management-system according to claim 7, wherein the converter selects an optimal ingress boundary router and an optimal egress boundary router for each connections between the first and second IP-networks.

9. The management-system according to claim 7, wherein the path is a label switched path, the channels are wavelength channels, the first algorithm is an IP multi protocol label switching routing optimization algorithm and the optimiser reduces wavelength costs by aggregating label switched paths.

10. The management-system according to claim 7, wherein the management-system comprises an allocator which allocates at least one IP-packet-signal to at least one channel in said transport network.

11. The management-system according to claim 7, wherein the plurality of constraints and objectives of the second algorithm are one of flow conservation constraint, logical link capacity constraint, optical router port constraint, wavelength cost objective, optical router port occupation objective, advertised link number objective, spare capacity objective, wavelength re-use benefit objective and optical service level agreement constraint.

12. A method for use in a network-system comprising at least one first IP-network comprising first nodes, at least two of the first nodes being first edge-nodes, a second IP-network comprising second nodes, a transport-network comprising channel-switches for switching channels, and a management-system for managing networks, the method comprising:
  optimizing a network path in an IP-domain according to a first algorithm;
  converting IP-traffic-signals into transport-traffic-signals;
  optimising a topology that overlays the transport-network and a use of channels in said transport-network according to at least one second algorithm based on a plurality of constraints and objectives, in response to the converting the IP-traffic-signals into the transport-traffic-signals;
  outputting the result of the optimisation to a user for further configuration of the network system,
  wherein the management system manages the networks in an overlay environment where the network topology of the transport-network is not known to the management system, and
  wherein the IP-domain comprises the first and second IP-networks and a single entity representing the transport-network.

13. The method of claim 12, wherein the result of the optimization provides the user with topology and capacity of the IP links that have to be configured over the transport network.

14. A computer readable medium storing a program for enabling a computer to run an algorithm in a management-system for use in a network-system comprising at least one first IP-network comprising first nodes, at least two of the first nodes being first edge-nodes, a second IP-network comprising second nodes, a transport-network comprising channel-switches for switching channels, and said management-system for managing networks, the program comprising:
  means for optimizing a network path in an IP-domain according to a first algorithm;
  means for converting IP-traffic-signals into transport-traffic-signals; and
  means for optimizing a topology that overlays the transport-network and a use of channels in said transport-network according to at least one second algorithm based on a plurality of constraint and objectives, in response to the converting the IP-traffic-signals into the transport-traffic-signals,
  wherein the management system manages the networks in an overlay environment where the network topology of the transport-network is not known to the management system,
  wherein the IP-domain comprises the first and second IP-networks and a single entity representing the transport-network.

15. The computer readable medium according to claim 14, wherein the plurality of constraints and objectives are one of flow conservation constraint, logical link capacity constraint, optical router port constraint, wavelength cost objective, optical router port occupation objective, advertised link number objective, spare capacity objective, wavelength re-use benefit objective and optical service level agreement constraint.

* * * * *